(No Model.)
M. P. COLEMAN.
HOSE CARRIAGE.
No. 394,556. Patented Dec. 18, 1888.
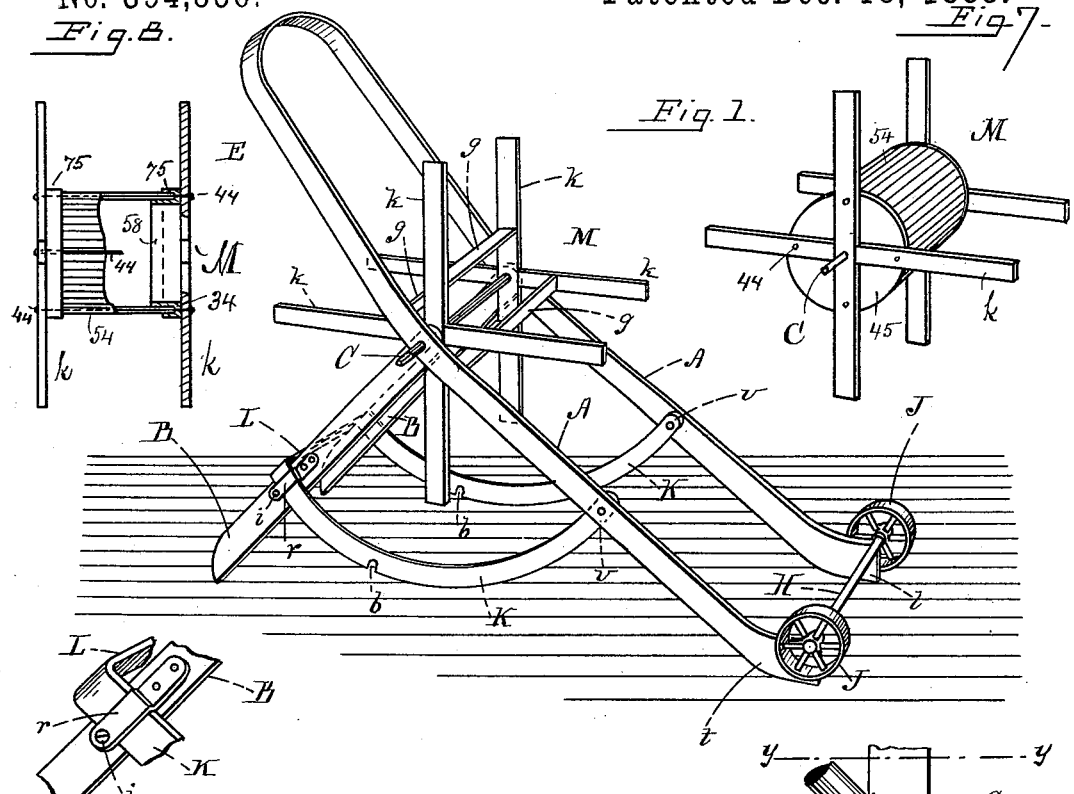
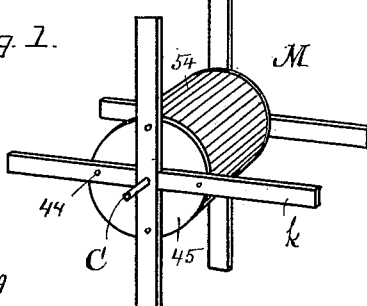
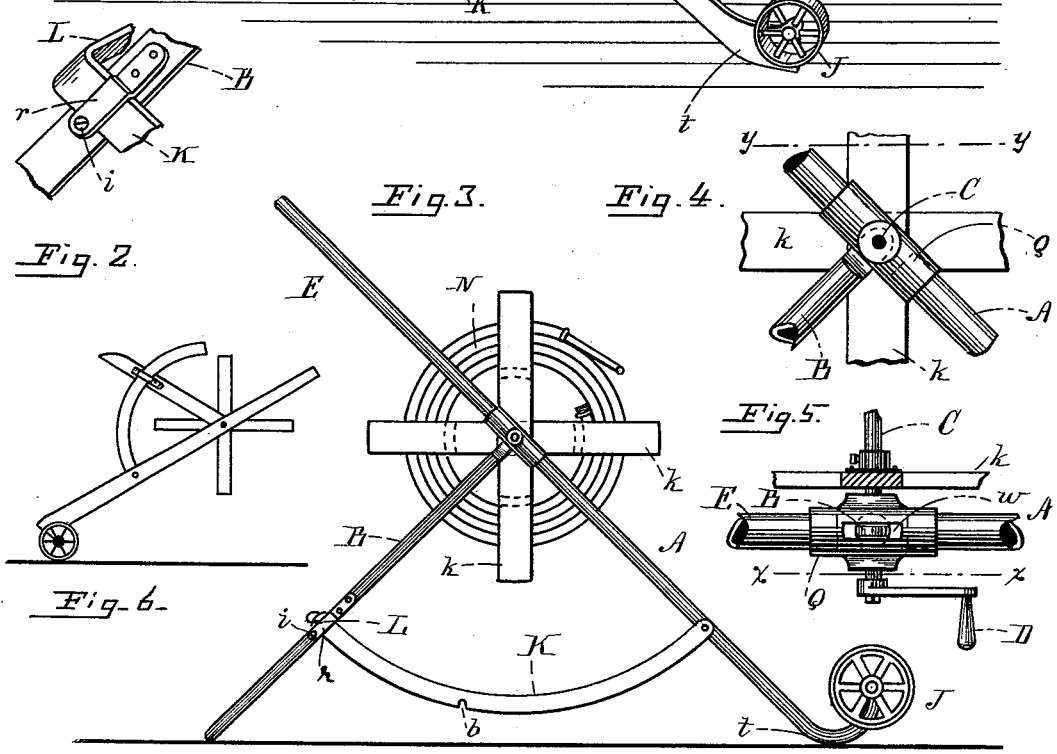
Witnesses:
Joseph D. Matthews,
E. M. Spinney.
Inventor:
Michael P. Coleman
per C. A. Shaw & Co.,
Att'ys.
N. PETERS, Photo-Lithographer, Washington, D. C.

UNITED STATES PATENT OFFICE.

MICHAEL P. COLEMAN, OF BOSTON, MASSACHUSETTS.

HOSE-CARRIAGE.

SPECIFICATION forming part of Letters Patent No. 394,556, dated December 18, 1888.

Application filed April 10, 1888. Serial No. 270,166. (No model.)

*To all whom it may concern:*

Be it known that I, MICHAEL P. COLEMAN, of Boston, in the county of Suffolk, State of Massachusetts, have invented a certain new and useful Improvement in Hose-Carriages, of which the following is a description sufficiently full, clear, and exact to enable any person skilled in the art or science to which said invention appertains to make and use the same, reference being had to the accompanying drawings, forming part of this specification, in which—

Figure 1 is an isometrical perspective view of my improved hose-carriage represented as in position for use; Fig. 2, an enlarged sectional view showing certain details of construction; Fig. 3, a side elevation showing a modification of the invention; Fig. 4, a vertical transverse section taken on line $x$ $x$ in Fig. 5; Fig. 5, a vertical horizontal section taken on line $y$ $y$ in Fig. 4; Fig. 6, a view showing the trucks resting on the ground, the carriage being in position to be wheeled or trundled; Fig. 7, a perspective view of the drum detached, and Fig. 8 a side elevation of the drum partly in section and with its crank-shaft removed.

Like letters and figures of reference indicate corresponding parts in the different figures of the drawings.

My invention relates to that class of hose-carriages which are designed more especially for lawn and garden hose; and it consists in certain novel features, as hereinafter fully set forth and claimed, the object being to produce a more effective and otherwise desirable device of this character than is now in ordinary use.

The nature and operation of the improvement will be readily understood by all conversant with such matters from the following explanation:

In the drawings, A A represent the side rails, and B B the legs, which are respectively pivoted at their upper ends to a horizontally-arranged shaft, C, one end of which is squared to receive a crank, D. The upper ends of the rails A are elongated and connected to form a handle, E, their lower ends being curved downwardly to form shoes $t$. A horizontally-arranged shaft, H, is journaled on said shoes, said shaft being provided with a truck, J, at its outer ends, and so fitted as to serve as a brace to keep the lower ends of the rails A in proper position. If preferred, however, the truck may be journaled on the shoe by other means, or without the aid of the shaft H, and a separate brace employed for the lower portions of the rails A. A downwardly-curved locking-brace, K, is pivoted to each of the rails A midway between the shaft C and shoe $t$, as shown at $v$, said braces K passing loosely through clasps $r$ on the legs B, and being connected at one end by a cross-bar, L, which serves not only to prevent them from being withdrawn from said clasps, but also to brace the legs B. Any other suitable form of brace may, however, be employed for the legs, and the bars K also prevented from being withdrawn from the clasps by any other suitable means, if desired.

A notch, $b$, is formed in the lower side of each of the braces K, and stop-screws $i$ inserted in the legs B, and when said legs are moved inward until said notches register with said screws the legs may be locked by dropping or depressing the braces until the screws enter the notches. One notch only is shown in each brace; but several may be employed, if deemed necessary. A drum, M, for receiving the hose N, is mounted on the shaft C in such a manner as to be turned with said shaft, said drum consisting, essentially, of two heads, 45, the crossed bars $k$, and a series of horizontal slats, 54.

Each of the heads is provided with two inwardly-projecting annular flanges, 58 and 75, between which the ends of the slats are secured in the groove 34 by stay-rods 44, which pass longitudinally through the drum.

Two of the crossed arms $k$ are employed at each end of the drum; but more may be used, if desired. I also sometimes construct the drum as shown in Fig. 1, omitting the heads 45, rods 44, and slats 54, and connecting the arms $k$ by horizontal bars $g$, as shown in Fig. 1. I also sometimes construct the side rails, legs, and handle of the device of iron pipe, as shown in Figs. 3, 4, and 5, the rails A and handle E being connected by couplings Q, and the upper ends of the legs pivoted in mortises $w$ in said couplings.

In the use of my improvement the hose may be wound onto the drum M by the crank D in the usual manner, or by revolving the drum by means of the arms $k$, and the carriage reversed to bring its trucks J onto the ground, as shown in Fig. 6, after which it is drawn or wheeled to the lawn or other place where it is to be used and arranged as shown in Fig. 1.

Nearly all hose-carriages of this character are easily upset in drawing off the hose from the drum, and much difficulty is experienced in transporting them from place to place and packing or storing them when not in use. These objections are obviated in my improved carriage, the legs proper, B, and lower portions of the rails A, which also serve as legs, being so arranged with respect to each other as to "brace" the machine and prevent it from upsetting in pulling the hose from the drum. The trucks J also enable it to be readily wheeled or transported from place to place, while the pivoted legs adapt it to be folded into a comparatively compact form for storage.

I do not confine myself to the use of two locking-braces K, as one may be employed by suitably connecting the legs B; neither do I confine myself to the use of two trucks J, as the lower ends of the rails A may be bent or curved inward until they meet, or nearly so, and one truck journaled in their lower ends and used for both, if desired, although I deem two preferable; nor to constructing the handle E precisely as shown, or U-shaped, as this feature may be varied considerably without departing from the spirit of my improvement.

Having thus explained my invention, what I claim is—

1. In a hose-carriage of the character described, the combination of the following instrumentalities, to wit: two rails adapted to serve as legs, and provided with a brace for their lower ends and a handle at their upper ends, a leg proper pivoted to each of said rails and provided with a guide-clasp and stop-screw, a brace for said legs, trucks journaled at the lower ends of said rails, locking-braces pivoted to the rails on which the trucks are journaled and fitted to work in said clasps, said locking-braces being provided with notches adapted to engage said stop-screws, and a drum for the hose mounted on a crank-shaft near the upper ends of said legs, substantially as set forth.

2. The improved hose-carriage herein described, the same consisting of the rails A, provided with the handle E, the shaft H, journaled on the lower ends of the rails A and provided with trucks J, the shaft C, journaled in the rails A, the drum M, mounted on said shaft, the legs B, pivoted to said shaft and provided with the guide-clasps $r$ and screws $i$, and the locking-braces K, pivoted to the rails A and connected by the bar L, said locking-braces being inserted in the clasps $r$ and provided with the notches $b$, all combined and arranged to operate substantially as described.

3. In a hose-carriage, two pairs of legs pivoted on a shaft near their upper ends, one pair of said legs being provided with one or more trucks at their lower ends and a handle at their upper ends, an adjustable locking brace or braces for connecting the legs below their pivoted points, and a drum for the hose mounted on said shaft, all being combined and arranged to operate substantially as set forth.

4. In a hose-carriage, the drum M, consisting of the heads 45, provided with the flanges 58 and 75, the slats 54, inserted in the grooves 34 between said flanges, the crossed bars $k$, and shaft C, constructed and arranged to operate substantially as described.

5. In a hose-carriage, the combination of the two side rails composed of iron pipe, a handle also composed of iron pipe, tubular couplings uniting said rails and handle, said couplings being provided with lateral slots, a shaft journaled in said couplings, legs extending through the slots of the couplings and pivoted to said shaft, a drum on said shaft, adjustable braces connecting said legs and rails, and a truck at the lower end of said rails, substantially as described.

6. In a hose-carriage, the combination of two side rails provided with shoes at their lower ends and a handle at their upper ends, legs pivoted to said rails and provided with guide-clasps and stop-screws, a brace for said legs, trucks journaled at the lower end of said rails above the bearing-surfaces of the shoes, whereby the carriage may be reversed for wheeling, locking-braces pivoted to the rails and adapted to work in the clasps of the legs, said locking-braces being provided with notches adapted to engage said stop-screws, a crank-shaft journaled at the upper end of said legs, and a drum for the hose mounted on said shaft.

MICHAEL P. COLEMAN.

Witnesses:
O. M. SHAW,
J. D. MATTHEWS.